US008322301B2

(12) United States Patent
Nakazono et al.

(10) Patent No.: US 8,322,301 B2
(45) Date of Patent: Dec. 4, 2012

(54) ELECTROSTATIC COATING DEVICE

(75) Inventors: Daisuke Nakazono, Tochigi (JP); Kohei Ogata, Tochigi (JP); Masaki Shigekura, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 875 days.

(21) Appl. No.: 12/374,526

(22) PCT Filed: Jan. 8, 2008

(86) PCT No.: PCT/JP2008/050072

§ 371 (c)(1),
(2), (4) Date: Jan. 21, 2009

(87) PCT Pub. No.: WO2008/084783

PCT Pub. Date: Jul. 17, 2008

(65) Prior Publication Data

US 2009/0178613 A1 Jul. 16, 2009

(30) Foreign Application Priority Data

Jan. 12, 2007 (JP) ................................. 2007-005000
Jan. 12, 2007 (JP) ................................. 2007-005010

(51) Int. Cl.
*B05B 5/025* (2006.01)
*B05B 15/02* (2006.01)
*A01G 23/10* (2006.01)

(52) U.S. Cl. ........ 118/629; 118/302; 239/690; 239/691; 239/693; 239/569; 239/112; 239/113

(58) Field of Classification Search .......... 118/620–640, 118/302; 239/690, 690.1, 693, 704, 127, 239/106, 112, 113, 124, 569; 427/475, 479, 427/480
See application file for complete search history.

(56) References Cited

U.S. PATENT DOCUMENTS 5,288,029 A * 2/1994 Ishibashi et al. .............. 239/691

FOREIGN PATENT DOCUMENTS

| | | |
|---|---|---|
| GB | 2249976 | 5/1992 |
| JP | 2002-210396 | 7/2002 |
| JP | 2004-165373 | 6/2004 |
| JP | 2004-275976 | 10/2004 |

* cited by examiner

*Primary Examiner* — Yewebdar Tadesse
(74) *Attorney, Agent, or Firm* — Rankin, Hill & Clark LLP

(57) ABSTRACT

An intermediate reserve tank for temporarily storing a conductive coating medium is provided in a coating medium supply passage for supplying the conductive coating medium from a color switch valve mechanism to a spray gun. A block valve mechanism for electrically insulating the color switch valve mechanism and the intermediate reserve tank is provided. A coating medium extrusion portion for supplying water or a cleaning solution is connected to a transmission passage between the intermediate reserve tank and the spray gun via a switch valve. When an amount of the coating medium necessary until an end of a coating operation becomes a predetermined amount, the conductive coating medium is extruded by the water or the cleaning solution by switching the switch valve.

3 Claims, 14 Drawing Sheets

ELECTROSTATIC COATING DEVICE

TECHNICAL FIELD

The present invention relates to an improvement of an electrostatic coating device.

BACKGROUND ART

As a conventional electrostatic coating device, there is known an electrostatic coating device in which a reserve portion for temporarily storing a conductive coating medium is disposed in a coating medium supply passage for supplying a coating medium from a coating medium supply portion to a spray gun and the coating medium supply passage is cleaned when a color of the conductive coating medium is switched (for example, see JP-A-2004-275976).

FIG. 14 is a view illustrating a known electrostatic coating device 100. Hereinafter, an operation of the electrostatic coating device 100 shown in FIG. 14 will be described.

In order to perform an electrostatic coating operation, first, switch valves 112 and 114 of a block valve mechanism 106 are opened to connect supply passages 111, 113, and 123. For example, a coating medium valve 102 of a color switch valve mechanism 105 is opened and a servo motor 134 of an intermediate reserve tank 107 is driven so that a piston 126 is moved in an A1 direction.

As a result, a conductive coating medium of a predetermined color passes the supply passages 111, 112, and 113 from a coating medium valve 102 and is then filled in a cylinder chamber 128. At this time, a second dump valve 141 and a trigger valve 142 are closed.

Next, the switch valve 114 is closed, the trigger valve 142 is opened, and the servo motor 134 is driven so as to move a piston 126 to an A2 direction. As a result, the conductive coating medium is extruded under pressure from the cylinder chamber 128 to a transmission passage 137. Subsequently, the conductive coating medium passes through the trigger valve 142 and is sprayed from a spray gun 108. At this time, a high voltage is applied to the conductive coating medium and then an electrostatic coating operation is performed on a coating object (not shown).

When the electrostatic coating operation is performed, and then the electrostatic coating operation with the coating medium of a different color is performed, the second dump valve 141 and the trigger valve 142 are opened. At this time, a cleaning operation is performed by connecting the supply passages 111, 113, and 123 and by opening a first cleaning valve 101 so as to flow a cleaning solution into the supply passages 111, 113, and 123, the intermediate reserve tank 107, the transmission passage 137, and a third ejection passage 144 and to spray the cleaning solution.

At this time, the coating medium supply passage can be cleaned partly, but it is not economical in that the unused coating medium remaining in the coating medium supply passage is wasted. Accordingly, it is desirable to further reduce an amount of the coating medium remaining in the coating medium supply passage.

DISCLOSURE OF THE INVENTION

One or more embodiments of the invention provide an electrostatic coating device capable of further reducing an amount of an unused conductive coating medium remaining in a coating medium passage in view of economic efficiency.

According to one or more embodiments of the invention, in an electrostatic coating device in which a reserve portion for temporarily storing a conductive coating medium is disposed in a coating medium supply passage for supplying a conductive coating medium from a coating medium supply portion to a spray gun, an insulation portion for electrically insulating the coating medium supply portion and the reserve portion is disposed, and an electrostatic coating operation is performed by supplying the conductive coating medium to which a high voltage is applied from the reserve portion to the spray gun, a fluid supply portion for supplying water or a cleaning solution is connected to the coating medium supply passage between the reserve portion and the spray gun via a switch valve. When an amount of the coating medium necessary until an end of the electrostatic coating operation becomes a predetermined amount, the conductive coating medium is extruded by the water or the cleaning solution by switching the switch valve.

When the amount of the coating medium necessary until the end of the electrostatic coating operation becomes a predetermined amount during the electrostatic coating operation, the water or the cleaning solution is flown from the fluid supply portion into the coating medium supply passage between the reserve tank and the spray gun by switching the switch valve. Subsequently, the conductive coating medium remaining in the coating medium supply passage is extruded by use of the water or the cleaning solution, and then the electrostatic coating operation is performed by spraying the conductive coating medium.

At the time of the end of the electrostatic coating operation, the coating medium supply passage from the switch valve to a spray port of the spray gun can be almost filled with the water or the cleaning solution. Accordingly, the conductive coating medium is switched by the water or the cleaning solution and the amount of the coating medium remaining in the coating medium supply passage becomes smaller.

As a result, when the coating medium passage is cleaned in order to switch the color of the conductive coating medium, it is possible to reduce an amount of wasted conductive coating medium and to shorten a cleaning time, thereby improving economical efficiency.

According to one or more embodiments of the invention, in an electrostatic coating device in which a reserve portion for temporarily storing a conductive coating medium is disposed in a coating medium supply passage for supplying a conductive coating medium from a coating medium supply portion to a spray gun, the reserve portion includes a cylinder, a first piston and a second piston movably inserted into the cylinder, a piston rod attached to the second piston, a drive portion for driving the piston rod, and a valve mechanism for feeding water in a second chamber into a first chamber when an amount of the conductive coating medium in the first chamber becomes a predetermined amount in supplying the conductive coating medium from the first chamber to the spray gun by moving the first piston through the second piston and the water by the drive portion in a state where the conductive coating medium is filled in the first chamber disposed in a side of the end portion of the cylinder in the first piston and water is filled in the second chamber disposed in the side of the second piston in the first piston.

In order to perform an electrostatic coating operation, the conductive coating medium is supplied from the first chamber to the spray gun by applying a pressure to the conductive coating medium in the first chamber using the second piston and the water by the drive portion while the conductive coating medium is filled in the first chamber and the water is filled in the second chamber. At the time a remaining amount of the conductive coating medium remaining in the first chamber becomes a predetermined amount, the valve mechanism is opened to allow the water in the second chamber where a pressure increases to flow into the first chamber, so that the conductive coating medium is extruded by the water in the first chamber to the spray gun and then the conductive coating medium is sprayed from the spray gun.

At the time of the end of the electrostatic coating operation, the coating medium supply passage from the first chamber to a spray port of the spray gun can be almost filled with the water. Accordingly, the conductive coating medium is switched by the water and the amount of the coating medium remaining in the coating medium supply passage becomes smaller.

As a result, when the coating medium passage is cleaned in order to switch the color of the conductive coating medium, it is possible to reduce an amount of disused conductive coating medium and to shorten a cleaning time, thereby improving economical efficiency.

Other aspects and advantages of the invention will be apparent from the following description and the appended claims.

DESCRIPTION OF REFERENCE NUMERALS AND SIGNS

10: ELECTROSTATIC COATING DEVICE
12: FLUID SUPPLY PORTION (EXTRUSION PORTION)
23: SWITCH VALVE
105: COATING MEDIUM SUPPLY PORTION (COLOR SWITCHING VALVE MECHANISM)
106: INSULATION PORTION (BLOCK VALVE MECHANISM)
107: RESERVE PORTION (INTERMEDIATE RESERVE TANK)
108: SPRAY GUN
148: COATING MEDIUM SUPPLY PASSAGE
151: WATER
210: ELECTROSTATIC COATING DEVICE
211: COATING MEDIUM SUPPLY PORTION
214: RESERVE PORTION (INTERMEDIATE RESERVE TANK)
218: SPRAY GUN
236: COATING MEDIUM SUPPLY PASSAGE
240: CYLINDER
251: FIRST PISTON
252: SECOND PISTON
253: SECOND CHAMBER (UPPER CHAMBER)
254: FIRST CHAMBER (LOWER CHAMBER)
258: PISTON ROD
261: DRIVE PORTION
263: VALVE MECHANISM
265: CONDUCTIVE COATING MEDIUM
266: WATER

BEST MODE FOR CARRYING OUT THE INVENTION

Exemplary embodiments of the invention will be described with reference to the accompanying drawings. The drawings are shown in an order of signs.

First Exemplary Embodiment

Figure 1:
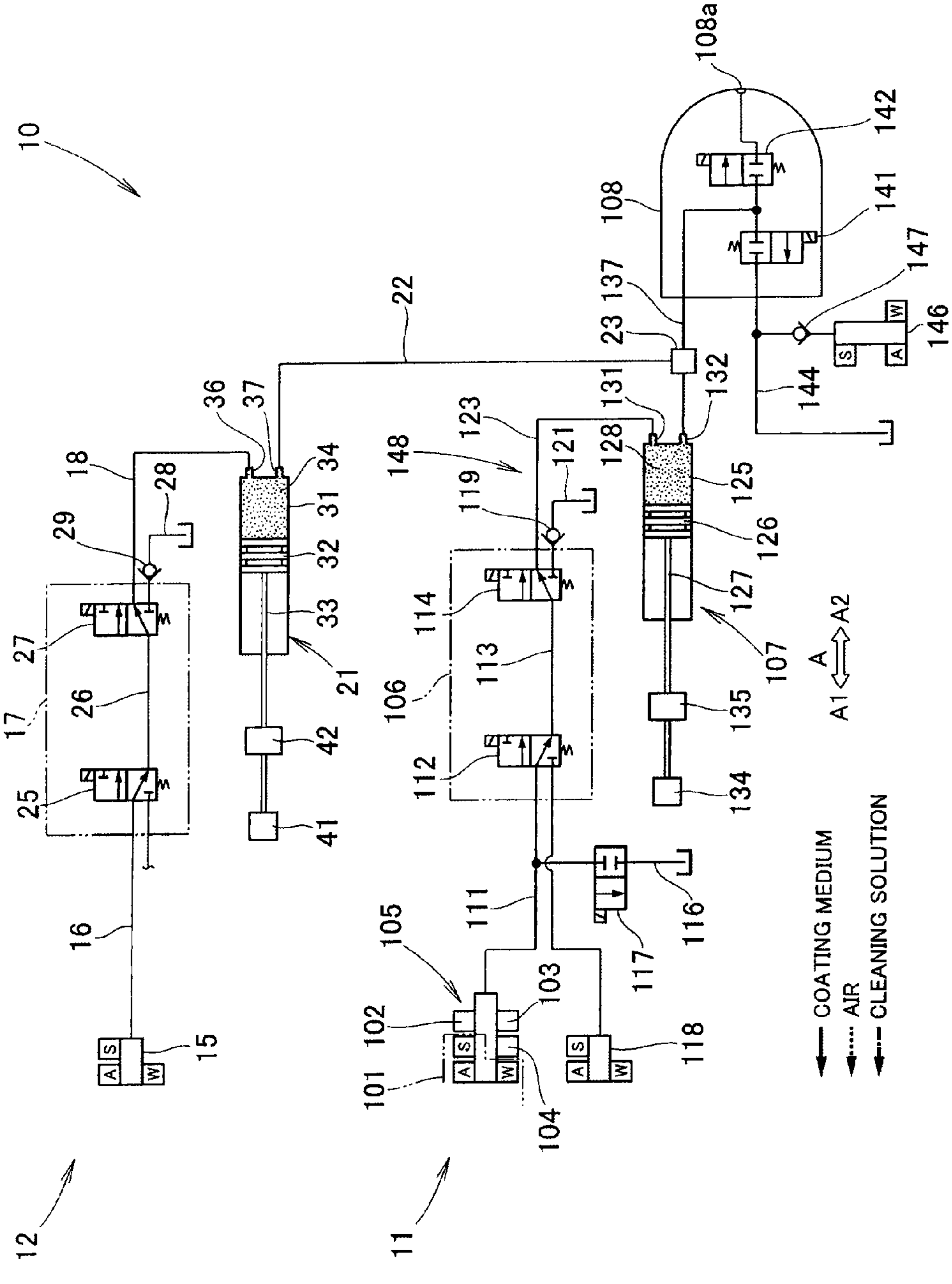
FIG. 1 is a view illustrating an electrostatic coating device according to a first exemplary embodiment.

FIG. 1 is a view illustrating an electrostatic coating device according to a first exemplary embodiment of the invention. An electrostatic coating device 10 includes a coating main body 11 for supplying a conductive coating medium from a coating medium supply portion to a spray gun and a coating medium extrusion portion (fluid supply portion) 12 connected to the coating main body 11 and for extruding the conductive coating medium used in an electrostatic coating operation by a fluid like water or a cleaning solution.

Figure 14:
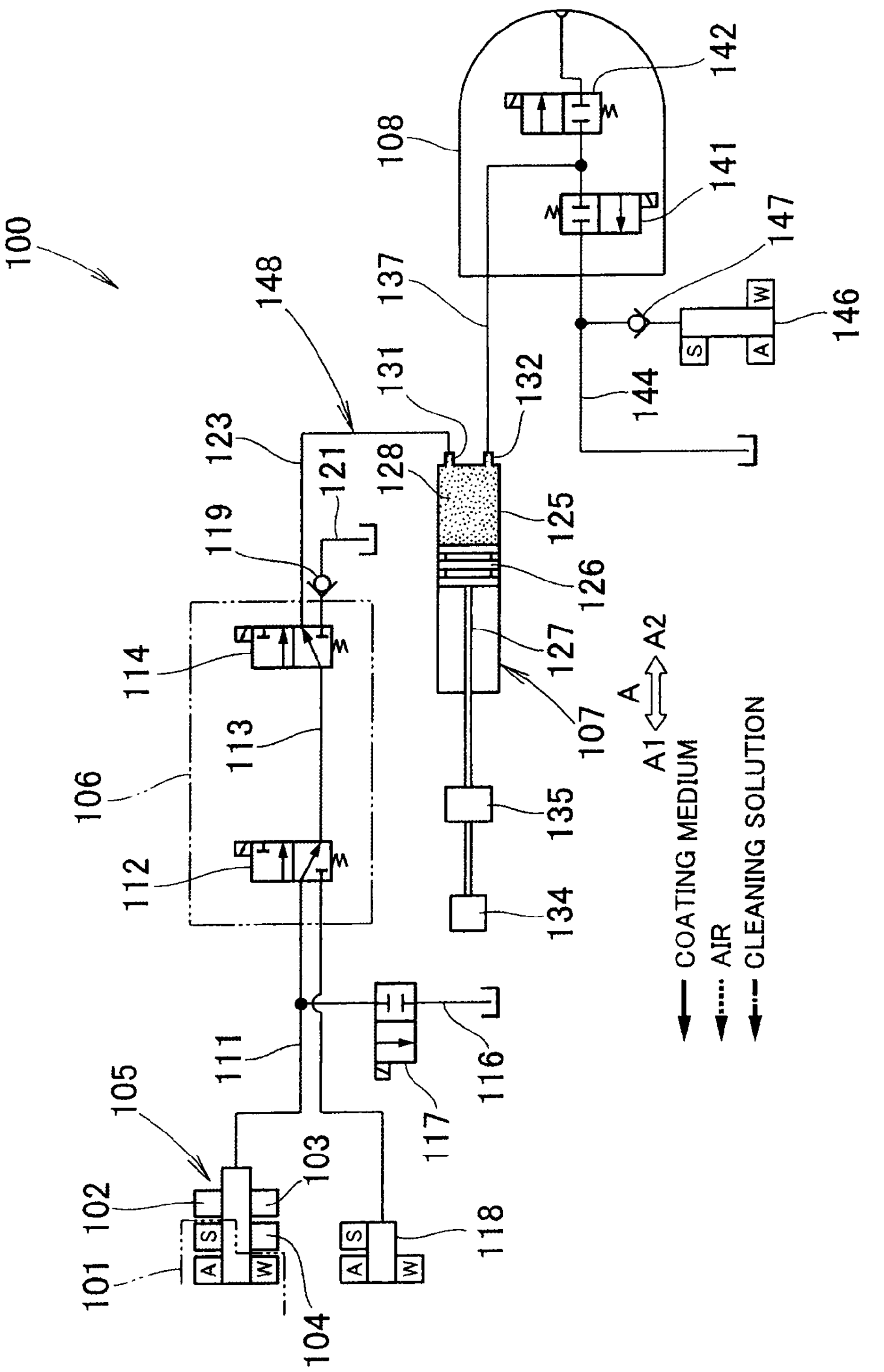
FIG. 14 is a view illustrating a known electrostatic coating device.

The coating main body 11 has the same configuration as that of an electrostatic coating device 100 shown in FIG. 14.

The same reference numerals are given to the same constituents as those of the electrostatic coating device 100 shown in FIG. 14.

As shown in FIG. 1, the coating main body 11 includes a first cleaning valve 101 for controlling a supply of a dry air A, water W, and a cleaning solution S; a color switch valve mechanism 105 which is constituted by coating medium valves 102, 103, and 104 and which is connected to a supply portion (not shown) for supplying a conductive coating medium with a different color so as to control a supply of the conductive coating medium; a block valve mechanism 106 for insulating the color switch valve mechanism 105 from a spray gun, which will be specifically described below; an intermediate reserve tank 107 connected to the block valve mechanism 106 so as to temporarily store the conductive coating medium; and a spray gun 108 connected to the intermediate reserve tank 107.

The block valve mechanism 106 includes a switch valve 112 connected to the color switch valve mechanism 105 via a supply passage 111, and a switch valve 114 connected to the switch valve 112 via a supply passage 113 as an electrically insulated conduit line formed of a resin. Reference numeral 116 denotes a first drainage passage connected to the supply passage via the first dump valve 117. Reference numeral 118 denotes a second cleaning valve connected to the switch valve 112 so as to control a supply of air A, water W, and a cleaning solution S. Reference numeral 121 denotes a second ejection passage connected to the switch valve 114 via an one-way valve 119.

The switch valve 112 switches the color switch valve mechanism 105 and the second cleaning valve 118 to each other. The switch valve 114 switches the intermediate reserve tank 107 connected to a supply passage 123, and the second drainage passage 121 to each other.

The intermediate reserve tank 107 includes a cylinder 125, a piston 126 movably inserted into a cylinder 125, a rod 127 attached to the piston 126, a cylinder chamber 128 formed by the cylinder 125 and the piston 126, and an injection port 131 and an ejection port 132 disposed on the end portion of the cylinder 125 so as to communicate with the cylinder chamber 128.

The rod 127 is connected to a servo motor 134 with ball screw means 135 interposed therebetween. When the servo motor 134 is driven, the rod 127 and the piston 126 are reciprocated in a cylinder axis direction (A direction shown in the drawing) by the use of the ball screw means 135.

The spray gun 108 is connected to the ejection port 132 of the intermediate reserve tank 107 via the transmission passage 137. The spray gun 108 includes a second dump valve 141 and a trigger valve 142 which are connected to the transmission passage 137 and is connected to high voltage applying means (not shown). Reference number 108*a* denotes a spray port of the spray gun 108 and corresponds to a portion configuring the end portion of the transmission passage 137.

The second dump valve 141 is connected to a third ejection passage 144 for ejecting a waste solution including the conductive coating medium and the cleaning solution that are produced at the time of performing a cleaning operation to the transmission passage 137. The third ejection passage 144 is connected to a third cleaning valve 146 for controlling a supply of the air A, the water W, and the cleaning solution S via a one-way valve 147.

The trigger valve 142 controls a spray of the conductive coating medium from the spray gun 108. The above-described supply passages 111, 113, and 123, the intermediate reserve tank 107, and the transmission passage 137 are constituents configuring a coating medium supply passage 148 from the coating medium supply passage to the spray gun 108.

The coating medium extrusion portion 12 includes a cleaning valve 15 for controlling a supply of the air A, the water W, and the cleaning solution S, a block valve mechanism 17 connected to the cleaning valve 15 via a supply passage 16, a reserve tank 21 connected to the block valve 17 via a supply passage 18, and a switch valve 23 connected to the reserve tank 21 via a transmission passage 22 and provided on the transmission passage 137 of the coating main body 137.

The block valve mechanism 17 includes a switch valve 25 connected to the supply passage 16 and a switch valve 27 connected to the switch valve 25 via a supply passage 26 serving as a insulated conduit line made of a resin. Reference numeral 28 denotes a second ejection passage connected to the switch valve 27 via a one-way valve 29.

The reserve tank 21 includes a cylinder 31, a piston 32 movably connected to the cylinder 31, a rod 33 attached to the piston 32, a cylinder chamber 34 formed by the cylinder 31 and the piston 32, and an injection port 36 and an ejection port 37 which are formed on the end portion of the cylinder 31.

The rod 33 is connected to a servo motor 41 with ball screw means 42 interposed therebetween. When the servo motor 41 is driven, the rod 33 and the piston 32 are reciprocated in a cylinder axis direction (A direction shown in the drawing) by the use of the ball screw means 42.

Figure 2:
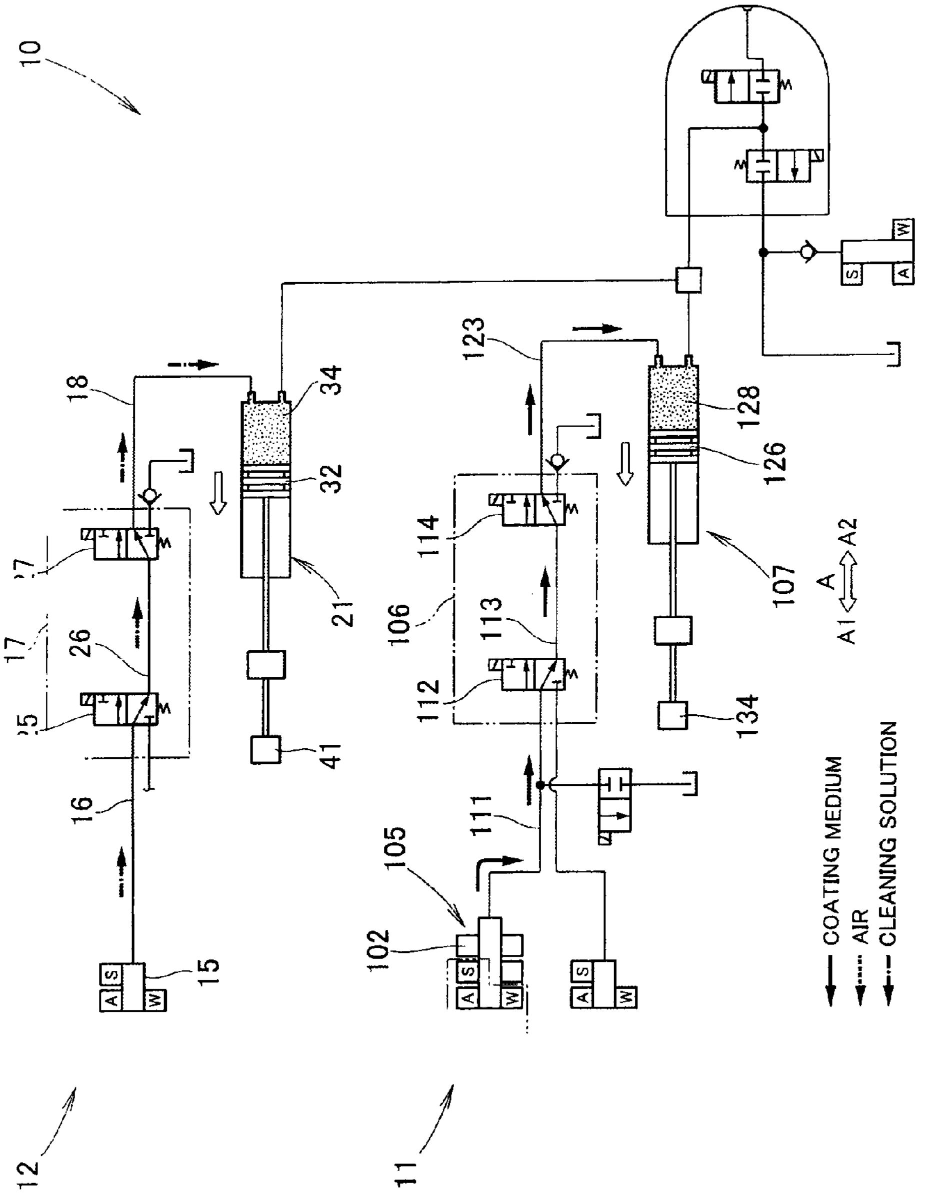
FIG. 2 is a view illustrating a first operation of the electrostatic coating device according to the first exemplary embodiment.

Next, an operation of the above-described electrostatic coating device 10 will be described. FIG. 2 is a view illustrating a first operation of the electrostatic coating device according to the first exemplary embodiment. First, the switch valves 112 and 114 of the block valve mechanism 106 are opened and the servo motor 134 of the intermediate reserve tank 107 is driven while, for example, the coating medium valve 102 of the color switch valve mechanism 105 is opened, so that the piston 126 is moved in the A1 direction. Accordingly, the conductive coating medium of a predetermined color passes the supply passages 111, 113, and 123 from the coating medium valve 102 and then is filled in the cylinder chamber 128 of the intermediate reserve tank 107.

In the state where the switch valves 25 and 26 of the block valve mechanism 17 are opened and the cleaning valve 15 is opened, the servo motor 41 of the reserve tank 21 is driven so that the piston 32 is moved in the A1 direction. Accordingly, the water or the cleaning solution passes from the cleaning valve 15 to the supply passages 16, 26, and 18, and then is filled in the cylinder chamber 34 of the reserve tank 21.

Figure 3:
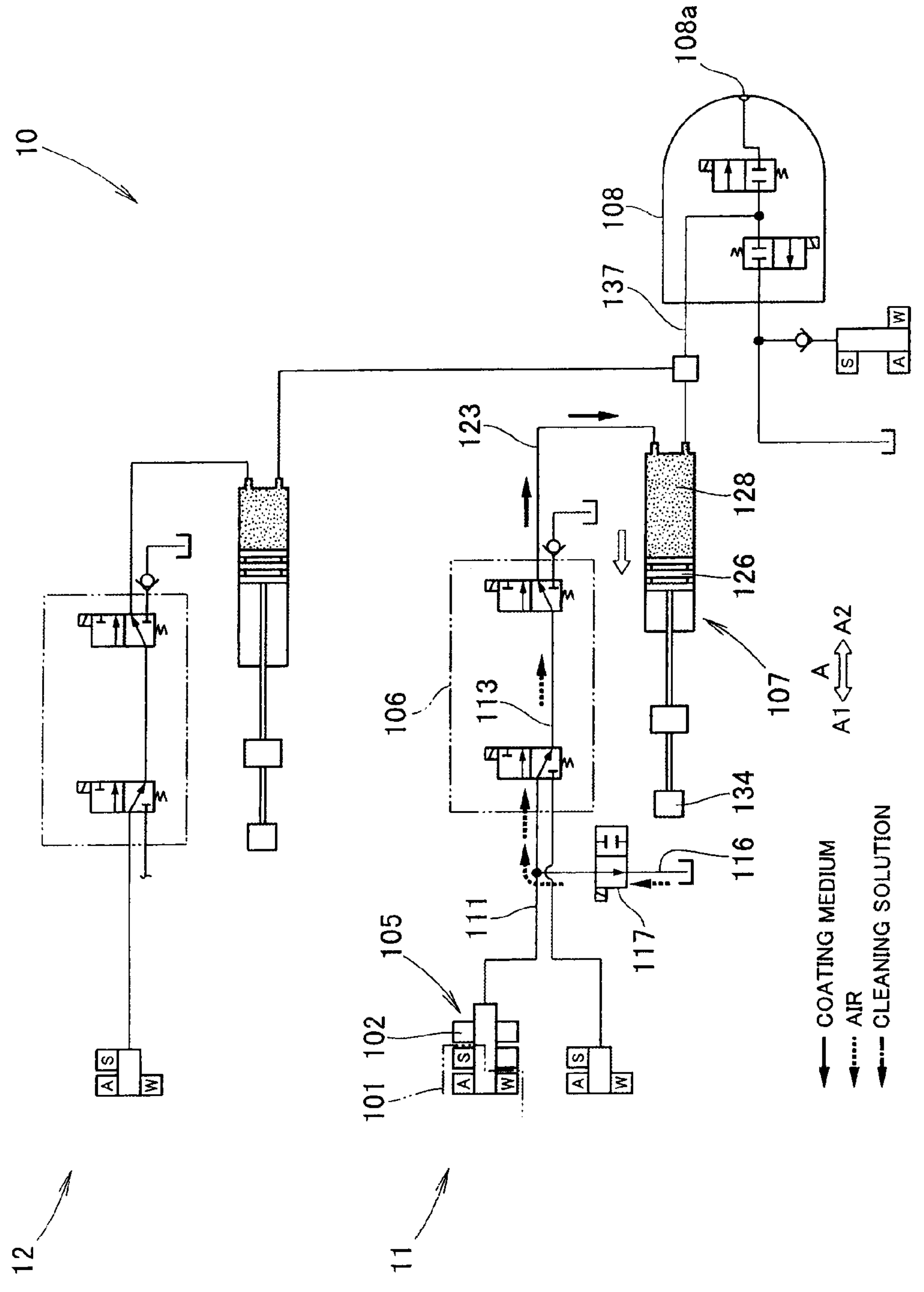
FIG. 3 is a view illustrating a second operation of the electrostatic coating device according to the first exemplary embodiment.

FIG. 3 is a view illustrating a second operation of the electrostatic coating device according to the first exemplary embodiment. Next, in the state where the servo motor 134 is further driven and the piston 126 is moved in the A1 direction, the coating medium valve 102 is closed and the first dump valve 117 is opened. Accordingly, the conductive coating medium in the supply passage 123 is drawn to the cylinder chamber 128 and the conductive coating medium and the switched air are introduced into the supply passage 113.

Figure 4:
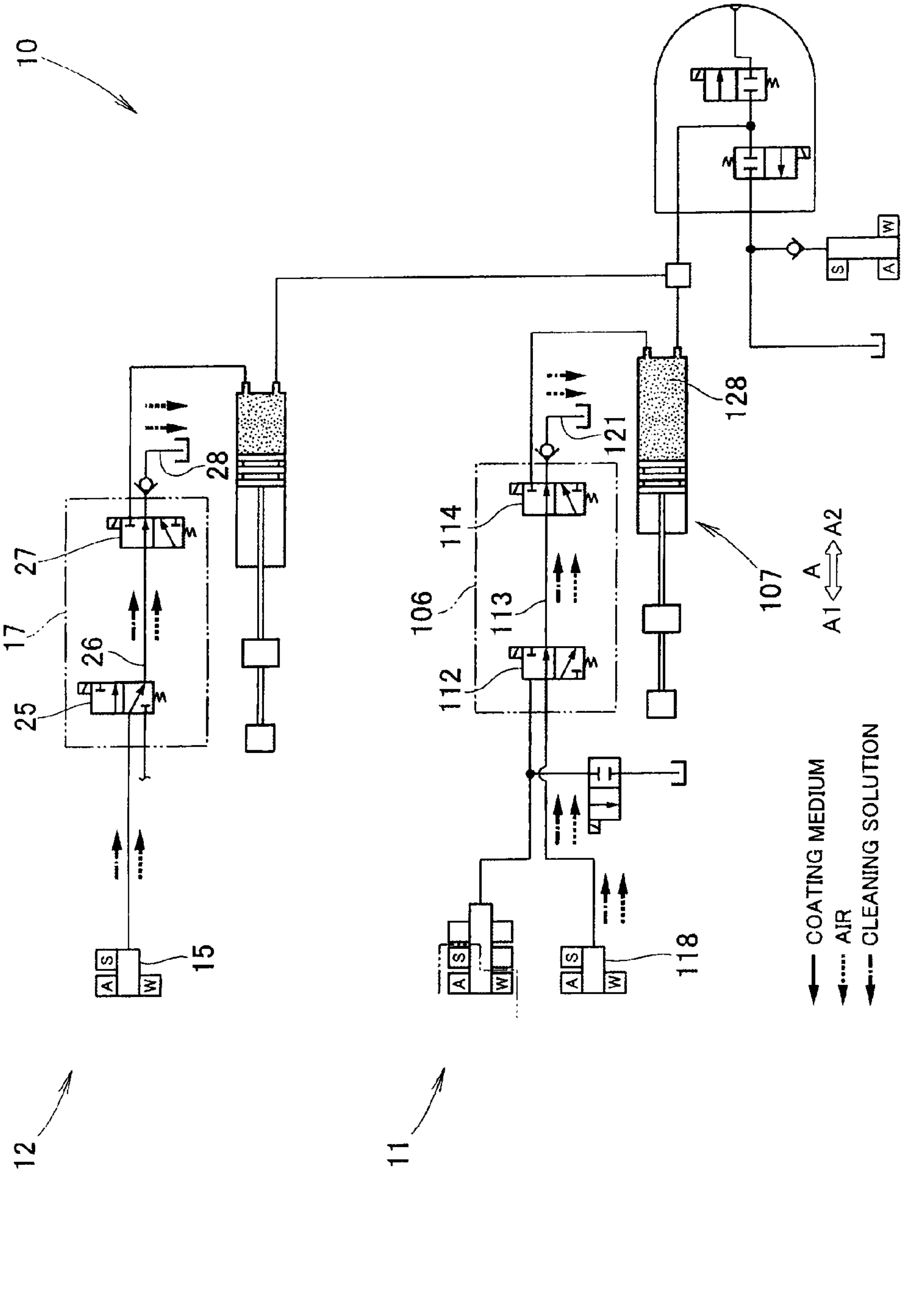
FIG. 4 is a view illustrating a third operation of the electrostatic coating device according to the first exemplary embodiment.

FIG. 4 is a view illustrating a third operation of the electrostatic coating device according to the first exemplary embodiment. After the conductive coating medium is completely filled in the cylinder chamber 128 of the intermediate reserve tank 107, the flow passages of the switch valves 112 and 114 of the block valve mechanism 106 are switched. Subsequently, the second cleaning valve 118 is opened, and then the cleaning solution is supplied from the second cleaning valve 118 to the supply passage 113 so as to clean the supply passage 113. The waste solution at this time is flown into the second ejection passage 121. Subsequently, the air is supplied from the second cleaning valve 118 to the supply passage 113 so as to dry the supply passage 113. As a result, the switch valve 112 is electrically insulated from the switch valve 114.

Subsequently, the flow passages of the switch valves 25 and 27 of the block valve mechanism 17 are switched, the cleaning valve 15 is opened, and then the cleaning solution is supplied from the cleaning valve 15 to the supply passage 26 so as to clean the supply passage 26. The waste solution at this time is flown into the second ejection passage 28. Subsequently, the air is supplied from the cleaning valve 15 to supply passage 26 so as to dry the supply passage 26. As a result, the switch valve 25 is electrically insulated from the switch valve 27.

Figure 5:
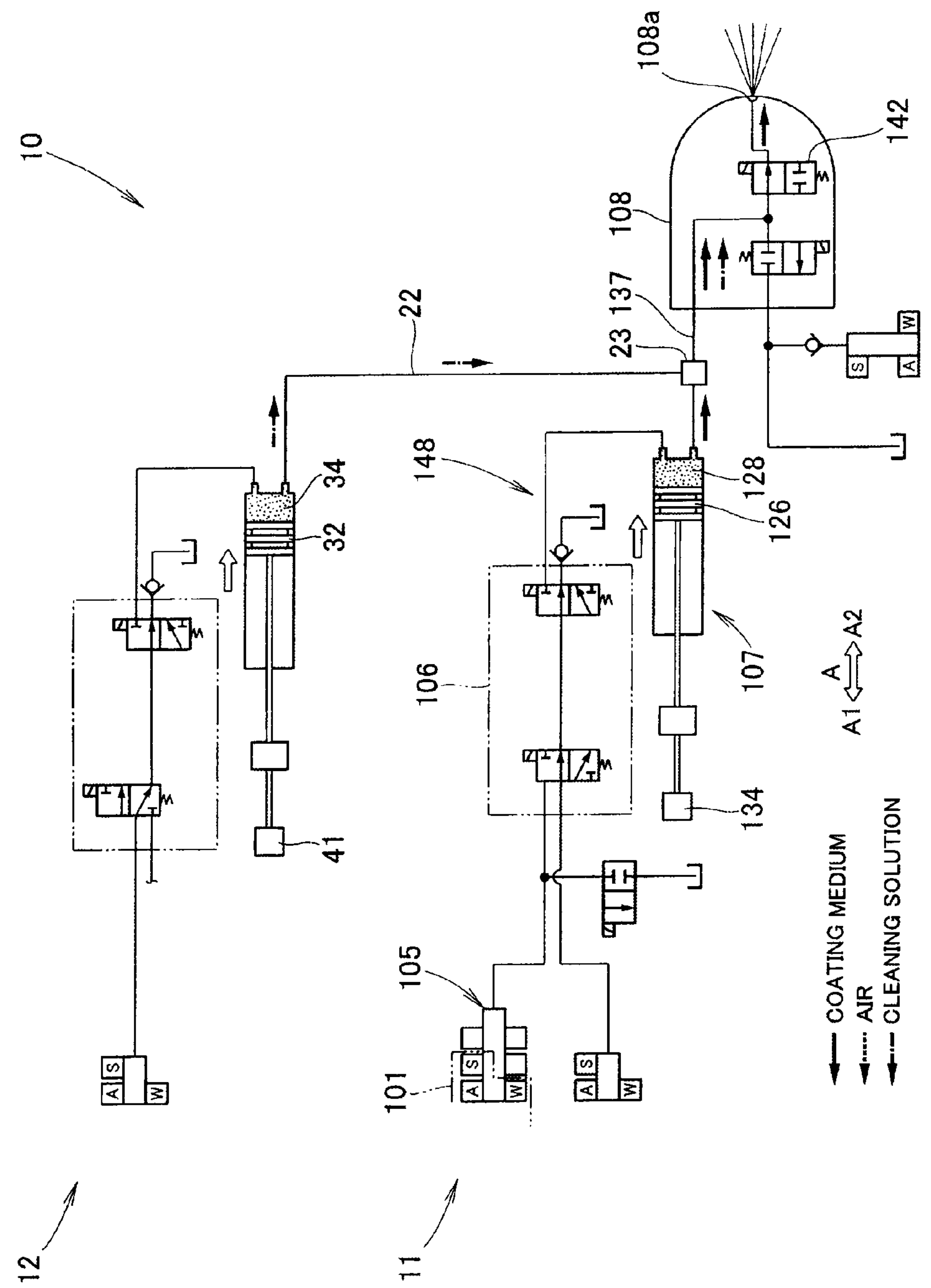
FIG. 5 is a view illustrating a fourth operation of the electrostatic coating device according to the first exemplary embodiment.

FIG. 5 is a view illustrating a fourth operation of the electrostatic coating device according to the first exemplary embodiment. The trigger valve 142 is opened, the servo motor 134 is driven, and then the piston 126 is moved in the A2 direction, so that the conductive coating medium is extruded from the cylinder chamber 128 to the transmission passage 137. Accordingly, the conductive coating medium passes the trigger valve 142, and then is sprayed from the spray gun 108. At this time, the high voltage is applied to the conductive coating medium, so that the electrostatic coating operation is performed on a coating object (not shown).

At the time the amount of the conductive coating medium necessary until the end of the electrostatic coating operation becomes a predetermined amount, the driving of the servo motor 134 is stopped. At this time, the flow passage of the switch valve 23 of the coating medium extrusion portion 12 is switched, and then the servo motor 41 is driven so as to move the piston 32 in the A2 direction. Accordingly, the water or the cleaning solution in the cylinder chamber 34 is supplied to the transmission passage 137 via the transmission passage 22 and the switch valve 23. The electrostatic coating operation continues by extruding the conductive coating medium using the water or the cleaning solution so that the conductive coating medium is sprayed from the spray gun 108. At the time of the end of the electrostatic coating operation, a small amount of conductive coating medium remains in the vicinity of the spray port 108*a* of the spray gun 108 so that the water or the cleaning solution is not sprayed from the spray port 108*a*.

Figure 6A:
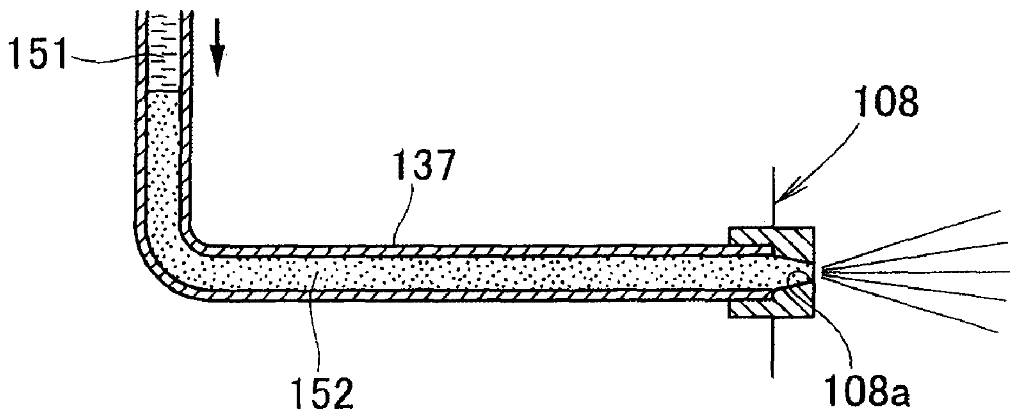
FIG. 6A is a view illustrating a fifth operation of the electrostatic coating device according to the first exemplary embodiment.
Figure 6B:
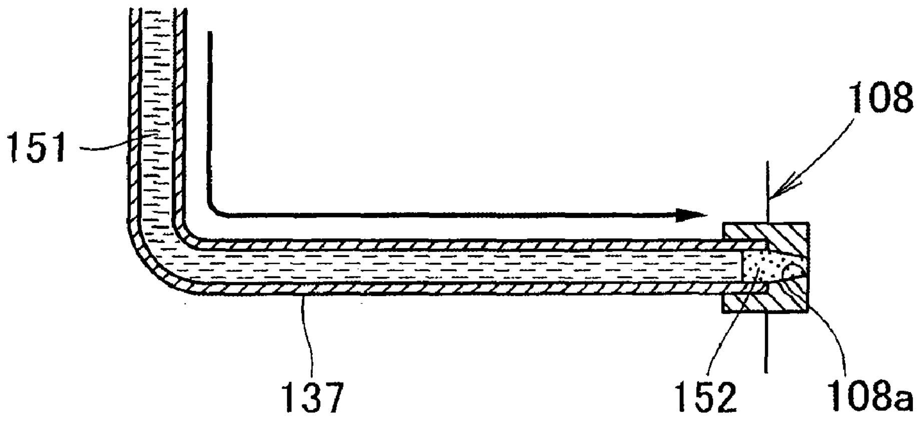
FIG. 6B is a view illustrating the fifth operation of the electrostatic coating device according to the first exemplary embodiment.

FIGS. 6A and 6B are views illustrating a fifth operation of the electrostatic coating device according to the first exemplary embodiment. FIG. 6A shows the inside of the transmission passage 137 in the state where the extrusion of water 151 or a conductive coating medium 152 starts. The conductive coating medium 152 is sprayed from the spray port 108*a* of the spray gun 108.

FIG. 6B is shows a state where the electrostatic coating operation ends. Since the water 151, as shown by the arrow, extrudes most of the conductive coating medium 152 in the transmission passage 137, a small amount of the conductive coating medium 152 remains in the vicinity of the spray port 108*a*. Likewise, since the electrostatic coating operation ends at the time a small amount of the conductive coating medium 152 remains in the vicinity of the spray port 108*a*, it is possible to further reduce the amount of the conductive coating medium remaining in the transmission passage 137. Additionally, it is possible to further reduce the amount of the disused coating medium when the inside of the transmission passage 137 is cleaned at the time of switching the color of the conductive coating medium. Moreover, quality of the coating surface of the coating object does not deteriorate in that the water cannot be sprayed from the spray port 108*a*.

Figure 7:
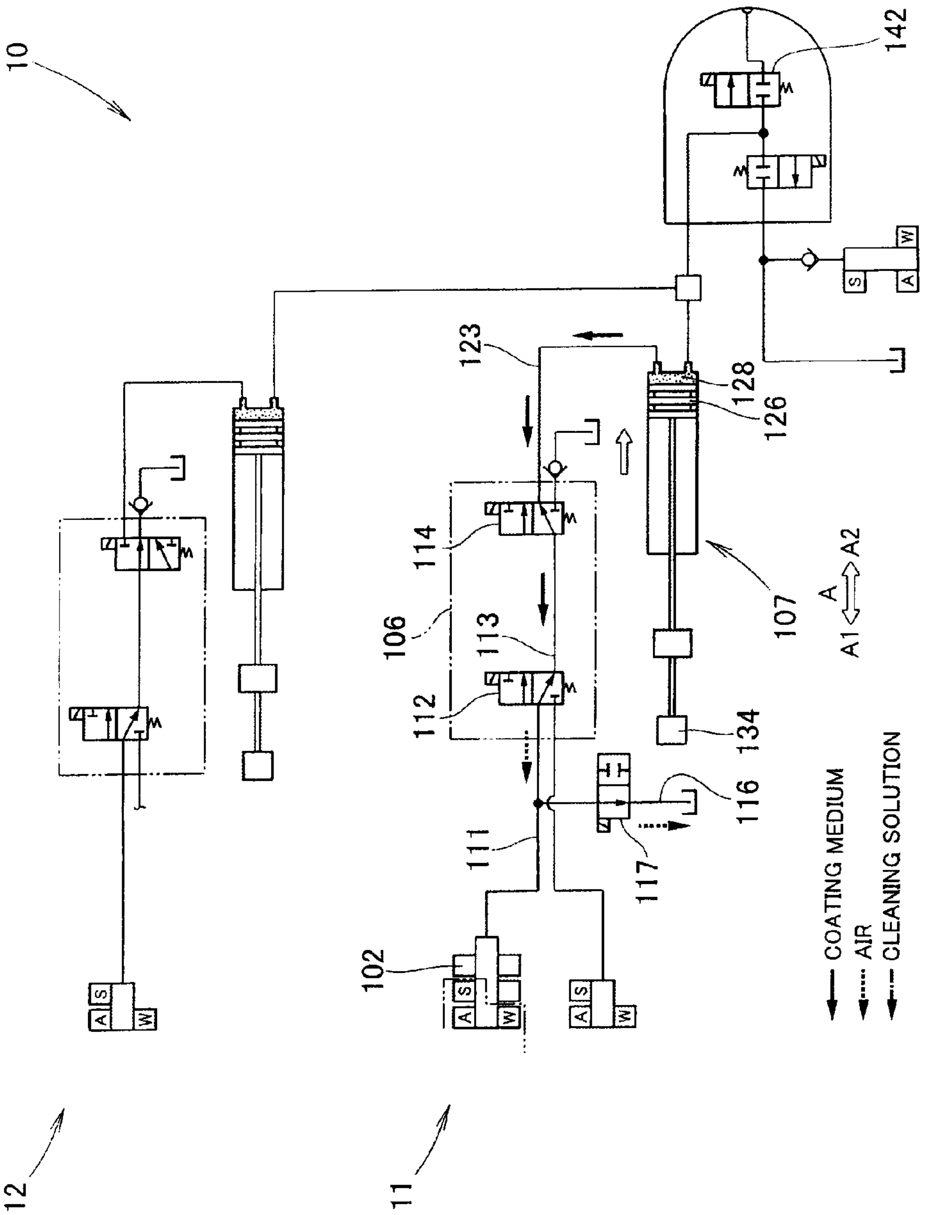
FIG. 7 is a view illustrating a sixth operation of the electrostatic coating device according to the first exemplary embodiment.

FIG. 7 is a view illustrating a sixth operation of the electrostatic coating device according to the first exemplary embodiment. After the electrostatic coating operation ends, the conductive coating medium remaining in the intermediate reserve tank 107 is temporarily retuned to the block valve mechanism 106.

That is, the trigger valve 142 is closed, the switch valves 112 and 114 are switched so as to connect the supply passages 111, 113, and 123, and the first dump valve 117 is opened so as to connect the supply passage 111 to the first ejection passage 116. Subsequently, the servo motor 134 is driven so as to move the piston 126 in the arrow A2 direction, so that the conductive coating medium remaining in the cylinder chamber 128 is temporarily returned to the supply passages 123 and 113. At this time, the air in the supply passages 123 and 113 is extruded to the supply passage 111 by the conductive coating medium, and then is ejected to the first ejection passage 116.

Accordingly, next, when the conductive coating medium is supplied to the supply passage 111 by opening the coating medium valve 102 in order to perform the electrostatic coating operation using the conductive coating medium of the same color, the air is not mixed in the conductive coating medium and the air is not introduced to the intermediate reserve tank 107. Accordingly, it is possible to keep coating quality in a satisfactory state with a simple process.

Next, as shown in FIG. 3, the supply of the coating medium from the color switch valve mechanism 105 is stopped, and the servo motor 134 is driven, so that the conductive coating medium in the supply passage 123 is drawn to the cylinder chamber 128. Accordingly, since the conductive coating medium is switched, the air exists in the supply passage 113 as the electrically insulated conduit line. Thus, the conductive coating medium does not exist in the supply passage 113 at the time of cleaning the block valve mechanism 106.

Accordingly, at the time of cleaning the block valve mechanism 106, it is possible to prevent the unused conductive coating medium remaining in the supply passage 113 from being disused, which enables an economic electrostatic coating operation in an easy manner.

In addition, since it is simple in that the supply of the conductive coating medium from the color switch valve mechanism 105 is stopped and the servo motor 134 is driven, it is possible to prevent the unused conductive coating medium from being unnecessarily disused with such a simple control. In particular, when the coating operation is performed for a long time, a large amount of the conductive coating medium in the supply passage 113 can be easily disused whenever the block valve mechanism 106 is cleaned. However, the electrostatic coating device 10 can improve highly economical efficiency.

In the case where a new conductive coating medium with a different color different from the conductive coating medium, after the above-described electrostatic coating operation ends, the applying action of the high voltage to the spray gun 108 is released. At this time, the switch valves 112 and 114 of the block valve mechanism 106 are switched, and the first cleaning valve 101 is opened so as to inject the cleaning solution into the cylinder chamber 128 of the intermediate reserve tank 107. Subsequently, the cylinder chamber 128 and the transmission passage 137 are cleaned by the cleaning solution, and the second dump valve 117 is opened so as to eject it from the third ejection passage 116. In addition, after the inside of the spray gun 108 is cleaned, the cleaning solution is sprayed from the spray port 108*a* to the outside.

Subsequently, for example, the conductive coating medium with a different color is supplied to the cylinder chamber 128 of the intermediate reserve tank 107 via the color switch valve 105 such as the coating medium valve 102, and then the coating operation may be performed by the same method described above.

As shown in FIGS. 5, 6A, and 6B, in the first exemplary embodiment, there is provided the electrostatic coating device 10 in which the intermediate reserve tank 107 serving as a reserve portion for temporarily storing the conductive coating medium is provided in the coating medium supply passage 148 for supplying the conductive coating medium from the color switch valve 105 serving as the coating medium supply portion to the spray gun 108; the block valve mechanism 106 serving as an insulation portion for electrically insulating the color switch valve 105 from the intermediate reserve tank 107 is provided; and the electrostatic coating operation is performed by supplying the conductive coating medium with the applied high voltage from the intermediate reserve tank 107 to the spray gun 108. The coating medium supply passage 148 between the intermediate reserve tank 107 and the spray gun 108, that is, the coating medium extrusion portion 12 serving as the fluid supply portion for supplying the water 151 or the cleaning solution to the transmission passage 137 is connected via the switch valve 23. Then, when the amount of the conductive coating medium necessary until the end of the coating operation becomes a predetermined amount, the conductive coating medium is extruded by the water 151 or the cleaning solution by switching the switch valve 23.

Accordingly, it is possible to reduce the amount of the disused conductive coating medium in the case where the coating medium supply passage 148 is cleaned in order to switch the color of the conductive coating medium. Moreover, it is possible to shorten the cleaning time, thereby improving the economical efficiency.

Second Exemplary Embodiment

Figure 8:
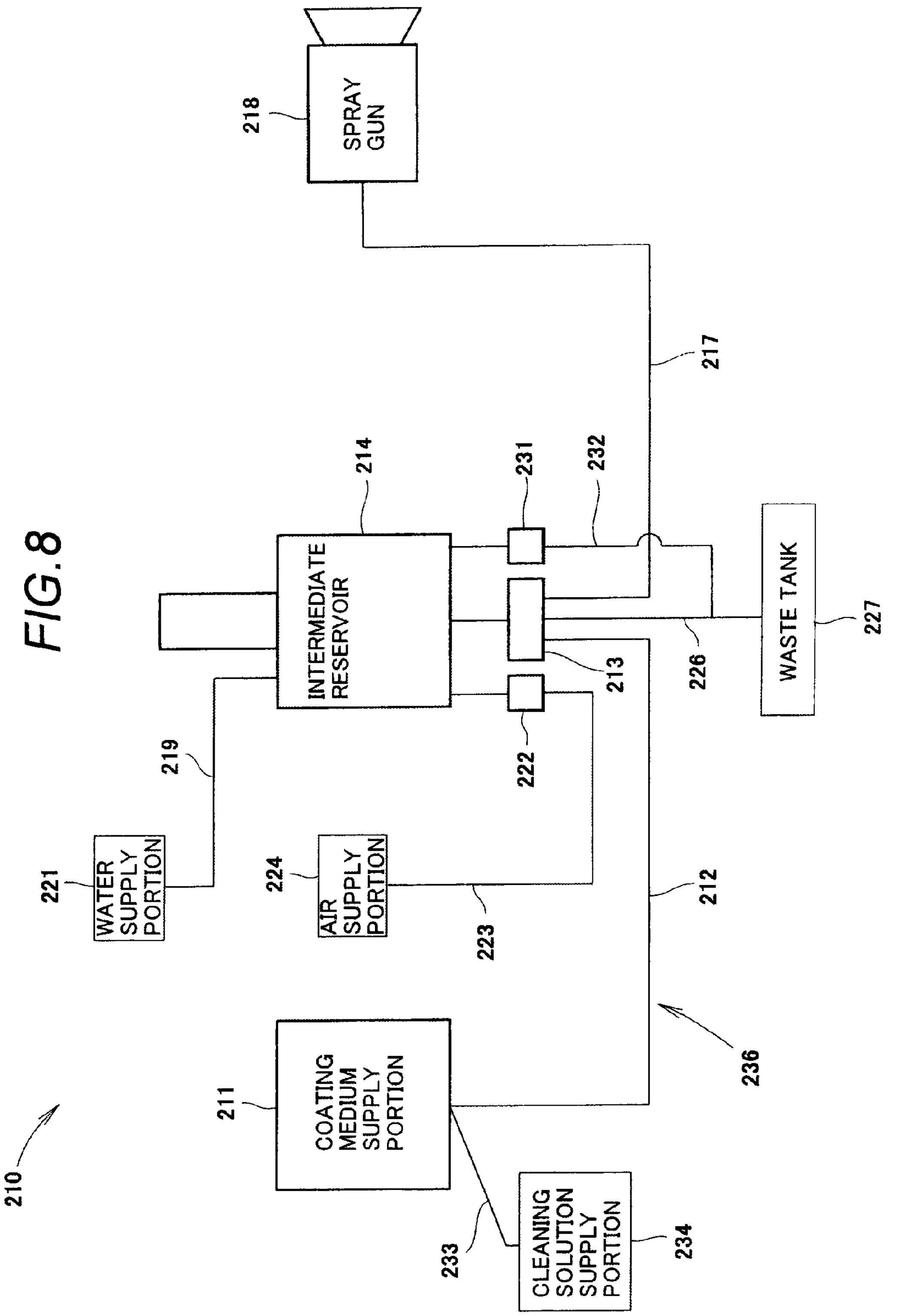
FIG. 8 is a view illustrating an electrostatic coating device according to a second exemplary embodiment.

FIG. 8 is a view illustrating the electrostatic coating device according to a second exemplary embodiment of the invention. An electrostatic coating device 210 includes a coating medium supply portion 211 serving as a supply source of the conductive coating medium with a plurality of colors; an intermediate reserve tank 214 (reserve portion) connected to the coating medium supply portion 211 via a supply passage 212 and a switch valve 213; a spray gun 218 connected to the intermediate reserve tank 214 via the switch valve 213 and the supply passage 217; a water supply portion 221 connected to the intermediate reserve tank 214 so as to supply water via a supply passage 219; an air supply portion 224 connected to the intermediate reserve tank 214 via a switch valve 222 and a supply passage 223 so as to supply air; a waste solution tank 227 connected to the switch valve 213 via a flow passage 226 so as to collect the waste solution at the time of cleaning the inside of the intermediate reserve tank 214 with air; a switch valve 231 and a flow passage 232 provided between the intermediate reserve tank 214 and the flow passage 226 so as to eject the waste solution from the intermediate reserve tank 214; a cleaning solution supply portion 234 connected to the end portion of the supply passage 212 via a supply passage 233 so as to clean the supply passage 212 with the cleaning solution; and a block valve mechanism (not shown) electrically insulating the spray gun 218, the coating medium supply portion 211, the water supply portion 221, the air supply portion 224, and the cleaning solution supply portion 234 when a high voltage is applied to the conductive coating medium during the time of the electrostatic coating operation. The supply passage 212, the switch valve 213, the intermediate reserve tank 214, and the supply passage 217 configure a coating medium supply passage 236 for supplying the conductive coating medium from the coating medium supply portion 211 to the spray gun 218.

Figure 9:
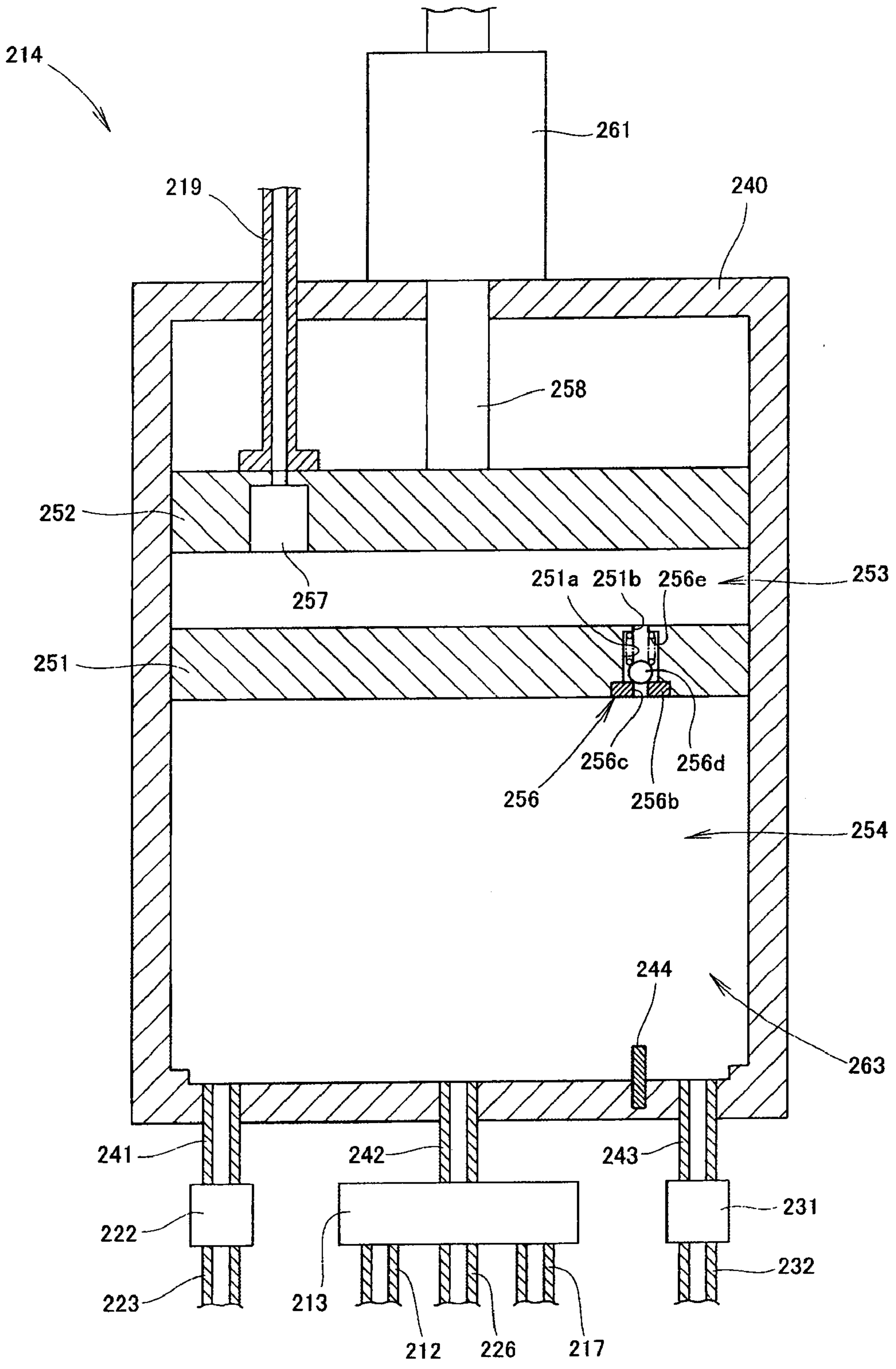
FIG. 9 is a sectional view illustrating an intermediate reserve tank according to the second exemplary embodiment.

FIG. 9 is a sectional view illustrating an intermediate reserve tank according to the second exemplary embodiment of the invention. The intermediate reserve tank 214 includes a cylinder 240; pipes 241 to 243 attached to the lower end portion of the cylinder 240 so as to be connected to the switch valves 222, 213, and 231; a pin 244 attached to the bottom of the cylinder 240; a first piston 251 and a second piston 252 movably inserted into the cylinder 240; a first water supply valve 256 provided in the first piston 251 so as to supply water from an upper chamber 253 formed on the upper portion of the first piston 251 to a lower chamber 254 formed on the lower portion of the first piston 251; a second water supply valve 257 provided in the second piston 252 so as to supply water to the upper chamber; a piston rod 258 attached to the second piston 252; and a drive portion 261 attached to the upper end portion of the cylinder 240 so as to drive the piston rod 258.

The above-described first water supply valve 256 configures a valve mechanism 263 along with the pin 244, and includes a valve seat **256*b* attached thereto so as to block an opening of a hole portion 251*a*, a ball 256*d* serving as a valve body received in the hole portion 251*a* so as to block a water passage 256*c* provided in the valve seat 256*b*, and a compressed coil spring 256*e* disposed between the upper end portion of the hole portion 251*a* and the ball 256*d* so as to press the margin of the water passage 256*c* with the ball 256*d*. Reference numeral 251*b* denotes a water passage penetrating from the upper end portion of the hole portion 251*a* to the upper surface of the first piston 251**.

An operation of the valve mechanism 263 is performed in a manner in which the drive portion 261 is operated to move down the second piston 252 through the piston rod 258 and to move down the first piston 251 through water in a state where the lower chamber 254 is filled with the conductive coating medium and the upper chamber 253 filled with water, so that the water in the upper chamber 253 is flown into the lower chamber 254 by opening the first water supply valve 256 with the pin 244 at the time the conductive coating medium in the lower chamber 254 becomes a predetermined amount when the conductive coating medium in the lower chamber 254 is supplied to the spray gun 218 (see FIG. 8).

Figure 10A:
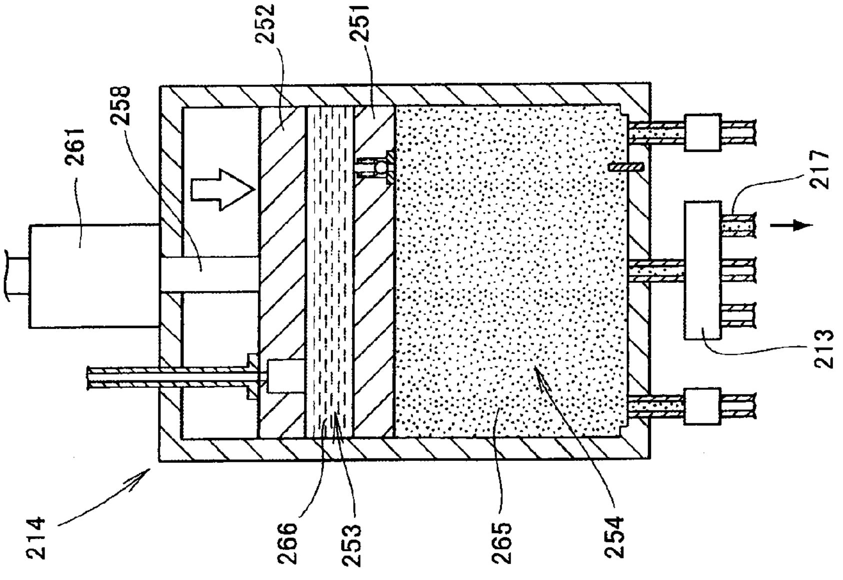
FIG. 10A is a view illustrating a first operation of the electrostatic coating device according to the second exemplary embodiment.
Figure 10B:
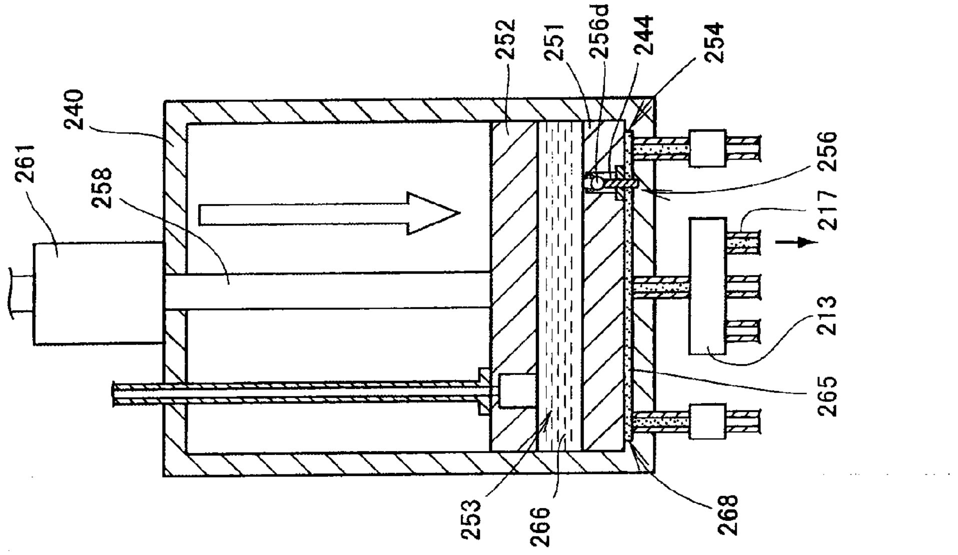
FIG. 10B is a view illustrating the first operation of the electrostatic coating device according to the second exemplary embodiment.
Figure 10C:
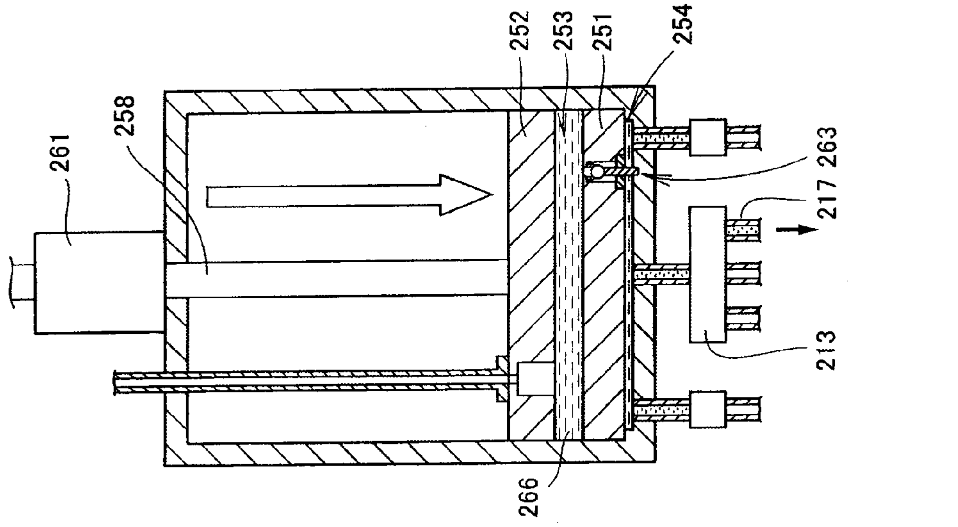
FIG. 10C is a view illustrating the first operation of the electrostatic coating device according to the second exemplary embodiment.

The above-described operation of the electrostatic coating device 210 will be described with reference to FIGS. 10A to 12B. FIGS. 10A to 10C are views illustrating a first operation of the electrostatic coating device according to the second exemplary embodiment of the invention. As shown in FIG. 10A, a conductive coating medium 256 supplied from the coating medium supply portion 11 (see FIG. 8) is filled in the lower chamber 254 and water 266 supplied from the water supply portion 221 (see FIG. 8) is filled in the upper chamber 253. In this state, the switch valve 213 is switched so as to connect the lower chamber 254 to the supply passage 217 and the drive portion 261 is operated so as to extend the piston rod 258 to the down side. Accordingly, the conductive coating medium 265 is supplied to the spray gun 218 (see FIG. 8) using the second piston 252, the water 266, and the first piston 251 via the supply passage 217, and then the electrostatic coating operation is performed by spraying the coating medium from the spray gun 218 (see FIG. 8) to the coating object.

FIG. 10B shows a state where the first piston 251 is moved down as much as possible in the cylinder 240 along with the water 266 and the second piston 252. At this time, since a space 268 exists between the bottom of the cylinder 240 and the first piston 251, a small amount of the conductive coating medium 265 remains in the gap 268. At this time, the first water supply valve 256 is opened by the ball 256*d* of the first water supply valve 256 contacting with the pin 244, and thus the upper chamber 253 and the lower chamber 254 communicate with each other.

As shown in FIG. 10C, when the drive portion 261 further moves down the second piston 252 using the piston rod 258, the water 266 in the upper chamber 253 passes the lower chamber 254 and flows into the supply passage 217, so that the conductive coating medium in the supply passage 217 is extruded. Accordingly, the conductive coating medium in the supply passage 217 reaches the spray gun 218 (see FIG. 8) to thereby be sprayed.

Figure 11A:
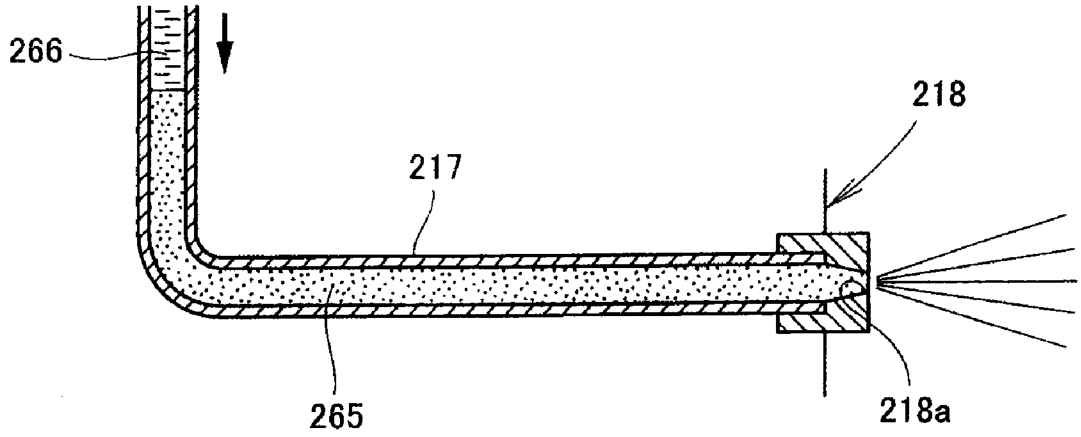
FIG. 11A is a view illustrating a second operation of the electrostatic coating device according to the second exemplary embodiment.
Figure 11B:
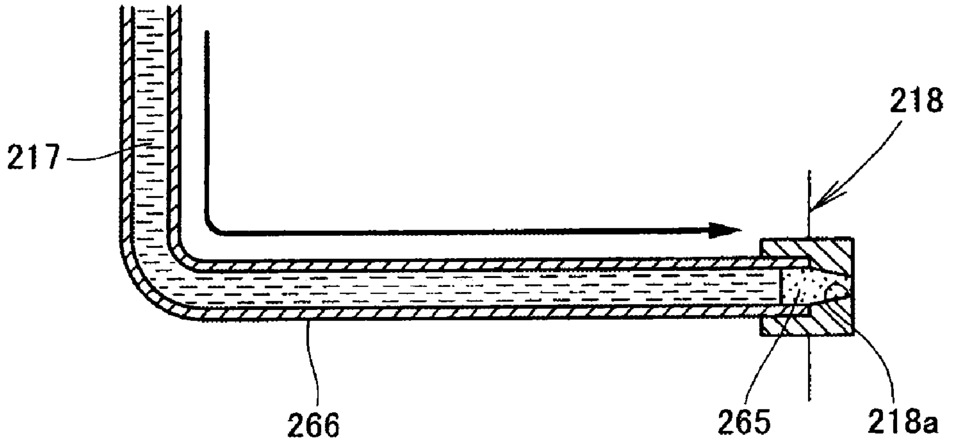
FIG. 11B is a view illustrating the second operation of the electrostatic coating device according to the second exemplary embodiment.

FIGS. 11A and 11B are views illustrating a second operation of the electrostatic coating device according to the second exemplary embodiment. FIG. 11A shows the inside of the supply passage 217 when the water 266 starts to extrude the conductive coating medium 255. The conductive coating medium 256 is sprayed from a spray port 218*a* of the spray gun 218.

FIG. 11B shows a state where the electrostatic coating operation ends. Since the water 266 extrudes most of the conductive coating medium 265 in the supply passage 217, a small amount of the conductive coating medium 265 remains in the vicinity of the spray port 218*a*. Likewise, since the electrostatic coating operation ends at the time a small amount of the conductive coating medium 265 remains in the vicinity of the spray port 218*a*, the amount of the disused conductive coating medium 265 at the time of cleaning the supply passage 217 becomes less. Additionally, the water 266 is not sprayed from the spray port 218*a*.

Figure 12A:
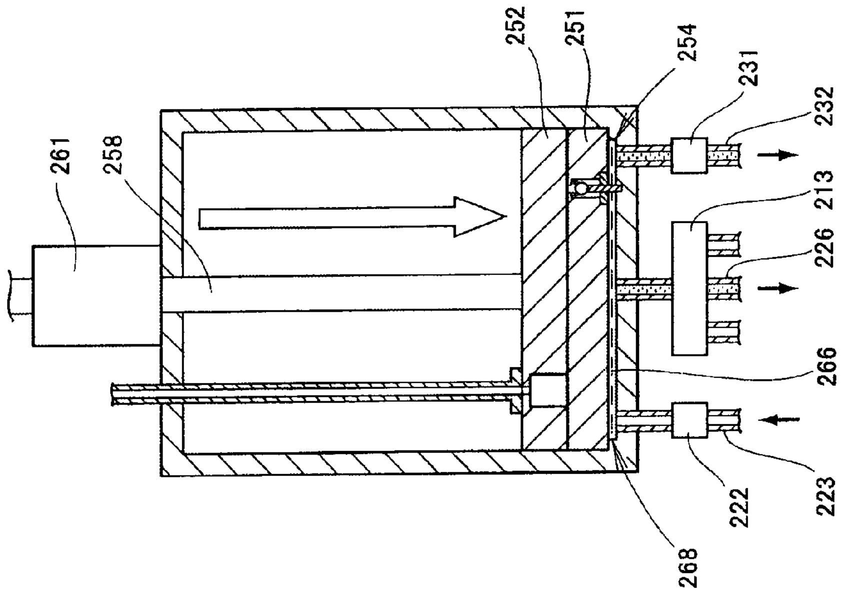
FIG. 12A is a view illustrating a third operation of the electrostatic coating device according to the second exemplary embodiment.
Figure 12B:
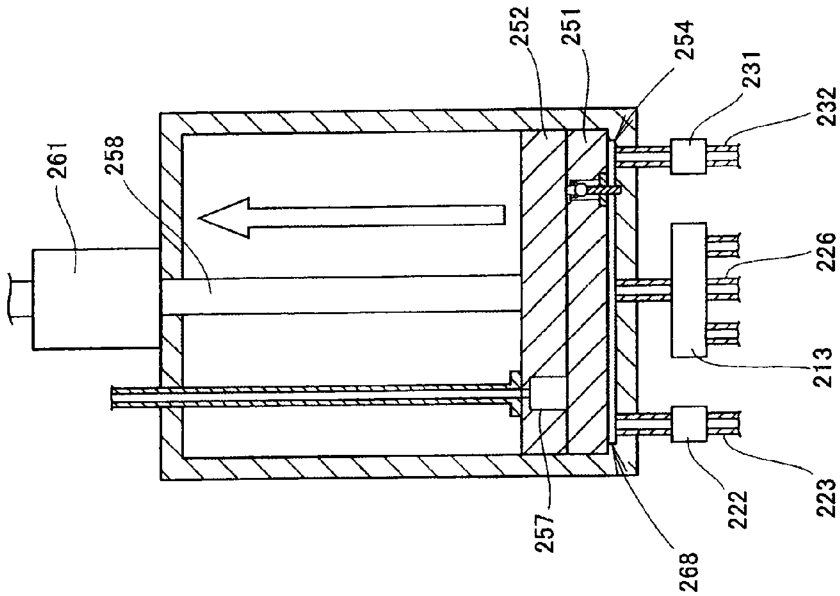
FIG. 12B is a view illustrating the third operation of the electrostatic coating device according to the second exemplary embodiment.

FIGS. 12A and 12B are views illustrating a third operation of the electrostatic coating device according to the second exemplary embodiment. FIG. 12A shows a state where the second piston 252 moves down until coming in contact with the first piston 251. At this time, the extrusion of the conductive coating medium by the water 266 ends, and thus the electrostatic coating operation ends.

In the case where a conductive coating medium with a different color different from the conductive coating medium is subsequently used, the switch valve 222 is opened, and then air is supplied from the air supply portion 224 (see FIG. 8) to the gap 268 via the supply passage 223 in order to clean the gap 268 of the lower chamber 254. The waste solution produced after the gap 268 is cleaned by the air flows into the flow passage 226 via the switch valve 213. Subsequently, the waste solution flows into the flow passage 232 via the switch valve 231, and then is collected by the waste solution tank 227 (see FIG. 8).

FIG. 12B shows a state where the gap 268 is cleaned by supplying air into the gap 268 of the lower chamber 254. After the lower chamber 254 is cleaned, as shown in FIG. 8, the supply passage 212 is cleaned with the cleaning solution by allowing the cleaning solution to flow into the supply passage 212 from the cleaning solution supply portion 234 via the supply passage 233. Then, the waste solution after the cleaning operation flows into the waste solution tank 227. In addition, as shown in FIG. 12B, the supply passage 212 is connected to the lower chamber 254 by switching the switch valve 213. Subsequently, the second piston 252 is moved up by opening the second water supply valve 257 and by operating the drive portion 261.

Figure 13B:
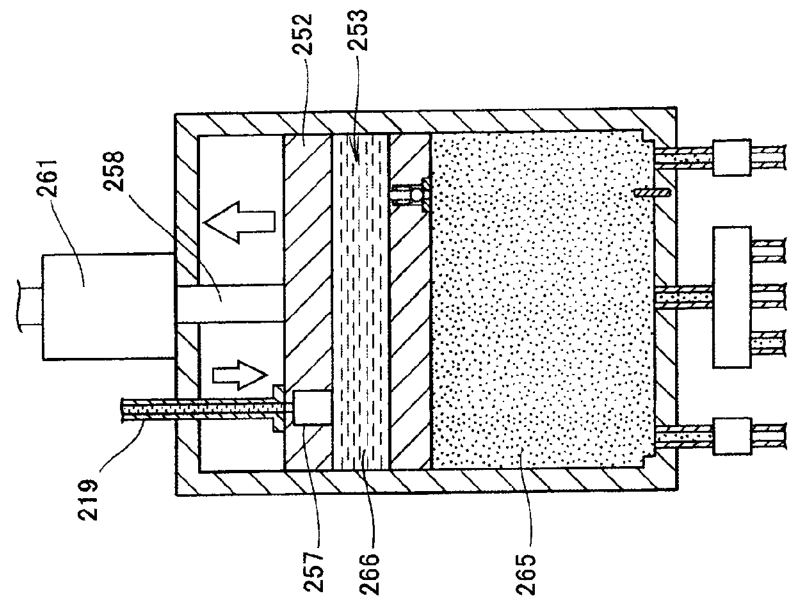
FIG. 13B is a view illustrating the fourth operation of the electrostatic coating device according to the second exemplary embodiment.
Figure 13A:
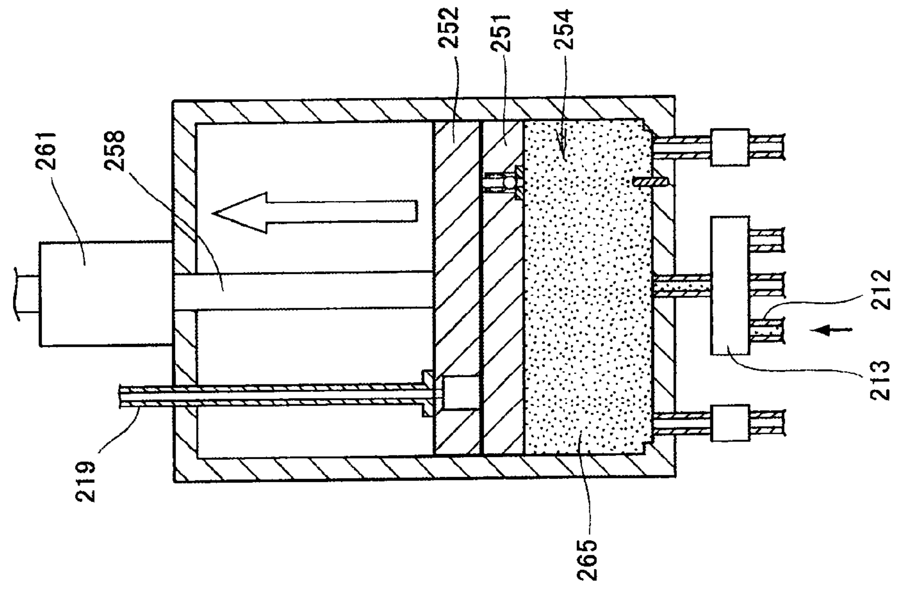
FIG. 13A is a view illustrating a fourth operation of the electrostatic coating device according to the second exemplary embodiment.

FIGS. 13A and 13B are views illustrating a fourth operation of the electrostatic coating device according to the second exemplary embodiment of the invention. As shown in FIG. 13A, when the second piston 252 is moved up, the first piston 251 is also moved up along with the second piston 252. The conductive coating medium 265 is supplied from the coating medium supply portion 211 (see FIG. 8) to the lower chamber 254 in accordance with the reduced pressure of the lower chamber 254.

As shown in FIG. 13B, after the lower chamber 254 is filled with a predetermined amount of the conductive coating medium 265, the second water supply valve 257 is opened so as to further move up the second piston 252. Subsequently, the water 266 is supplied from the water supply portion 221 (see FIG. 8) to the upper chamber 253 via the supply passage 219. Then, the electrostatic coating operation may be performed by the above-described processes shown in FIGS. 10A to 13B.

As shown in FIGS. 8, 10A to 10C, and 11A to 11B, there is provided the electrostatic coating device 210 in which the intermediate reserve tank 214 serving as a reserve portion for temporarily storing the conductive coating medium 265 is provided in the coating medium supply passage 236 supplying the conductive coating medium 265 from the coating medium supply portion 211 to the spray gun 218. The intermediate reserve tank 214 includes the cylinder 240; the first piston 251 and the second piston 252 movably inserted into the cylinder 240; the piston rod 258 attached to the second piston 252; the drive portion 261 driving the piston rod 258; and the valve mechanism 263 allowing the water 266 in the upper chamber 253 to flow into the lower chamber 254 at the time the conductive coating medium 265 in the lower chamber 254 becomes a predetermined amount when the drive portion 261 moves the first piston 251 so as to supply the conductive coating medium 265 in the lower chamber 254 to the spray gun 218 using the second piston 252 and the water 266 in the state where the conductive coating medium 265 is filled in the lower chamber 254 serving as the first chamber provided in the side of the first piston 251 close to the end portion of the cylinder and the water 266 is filled in the upper chamber 253 serving as the second chamber provided in the side of the first piston 251 close to the second piston 252. The conductive coating medium 265 is extruded to the spray gun 218 by the water 266 supplied from the inside of the lower chamber 254.

As a result, when the coating medium passage 236 is cleaned in order to switch the color of the conductive coating medium 265, it is possible to reduce an amount of disused conductive coating medium 265 and to shorten a cleaning time, thereby improving economical efficiency.

In the second exemplary embodiment, as shown in FIGS. 10A to 10C, the water 266 is filled in the upper chamber 253, but the invention is not limited thereto. The cleaning solution may be filled in the upper chamber 253. Accordingly, when the conductive coating medium is extruded by the cleaning solution, it is possible to clean the coating medium supply passage, thereby shortening the cleaning time.

While the present invention has been particularly shown and described with reference to exemplary embodiments thereof, it will be apparent by those skilled in the art that various changes inform and details may be made therein without departing from the spirit and scope of the invention.

This application claims the benefit of Japanese Patent Application No. 2007-005000 filed on Jan. 12, 2007 and Japanese Patent Application No. 2007-005010 filed on Jan. 12, 2007, the contents of which are hereby incorporated by reference.

INDUSTRIAL APPLICABILITY

An electrostatic coating device according to the invention can be appropriately applied to an electrostatic coating operation for a vehicle.

The invention claimed is:

1. An electrostatic coating device comprising:

a coating medium supply portion;

a coating medium supply passage for supplying a conductive coating medium from the coating medium supply portion to a spray gun;

a reserve portion disposed in the coating medium supply passage and for temporarily storing the conductive coating medium;

an insulation portion for electrically insulating the coating medium supply portion and the reserve portion;

a switch valve disposed in the coating medium supply passage between the reserve portion and the spray gun; and a fluid supply portion for supplying water or a cleaning solution to the coating medium supply passage through the switch valve, wherein the fluid supply portion includes:

a cleaning valve for controlling a supply of the water or the cleaning solution;

a block valve mechanism connected to the cleaning valve and having an insulation conduit line;

a reserve tank connected to the block valve mechanism; and a transmission passage for connecting the reserve tank and the switch valve, wherein the insulation conduit line electrically insulates the cleaning valve from the coating medium supply portion.

2. The electrostatic coating device according to claim 1, wherein the conductive coating medium in the coating medium supply passage is extruded by the water or the cleaning solution by switching the switch valve to supply the water or the cleaning solution from the fluid supply portion to the coating medium supply passage.

3. The electrostatic coating device according to claim 2, when an amount of the coating medium necessary until an end of a coating operation becomes a predetermined amount, the switch valve switches a flow from a flow passage between the reserve portion and the spray gun to a flow passage between the fluid supply portion and the spray gun.

* * * * *